US009501882B2

(12) United States Patent
Saravanan

(10) Patent No.: US 9,501,882 B2
(45) Date of Patent: Nov. 22, 2016

(54) SYSTEM AND METHOD TO STREAMLINE IDENTITY VERIFICATION AT AIRPORTS AND BEYOND

(75) Inventor: Thiagarajan Saravanan, Westborough, MA (US)

(73) Assignee: MorphoTrust USA, LLC, Billerica, MA (US)

(*) Notice: Subject to any disclaimer, the term of this patent is extended or adjusted under 35 U.S.C. 154(b) by 0 days.

(21) Appl. No.: 13/303,851

(22) Filed: Nov. 23, 2011

(65) Prior Publication Data

US 2012/0200390 A1 Aug. 9, 2012

Related U.S. Application Data

(60) Provisional application No. 61/458,397, filed on Nov. 23, 2010.

(51) Int. Cl.
*G05B 19/00* (2006.01)
*G07C 9/00* (2006.01)

(52) U.S. Cl.
CPC ....... *G07C 9/00111* (2013.01); *G07C 9/00103* (2013.01)

(58) Field of Classification Search
None
See application file for complete search history.

(56) References Cited

U.S. PATENT DOCUMENTS

| | | | | |
|---|---|---|---|---|
| 5,841,886 | A | 11/1998 | Rhoads | |
| 7,004,388 | B2 * | 2/2006 | Kohta | 235/381 |
| 8,385,590 | B1 | 2/2013 | Moorer | |
| 2002/0056043 | A1 | 5/2002 | Glass | |
| 2002/0157005 | A1 | 10/2002 | Brunk et al. | |
| 2003/0023858 | A1 | 1/2003 | Banerjee et al. | |
| 2003/0085808 | A1 * | 5/2003 | Goldberg | G06Q 10/06 340/531 |
| 2003/0136828 | A1 * | 7/2003 | Takesada et al. | 235/380 |
| 2003/0154406 | A1 | 8/2003 | Honarvar et al. | |
| 2004/0114779 | A1 | 6/2004 | Blazey | |
| 2004/0153649 | A1 | 8/2004 | Rhoads et al. | |
| 2004/0243806 | A1 | 12/2004 | McKinley et al. | |
| 2004/0258274 | A1 * | 12/2004 | Brundage et al. | 382/100 |
| 2005/0160271 | A9 | 7/2005 | Brundage et al. | |
| 2005/0240779 | A1 | 10/2005 | Aull et al. | |
| 2005/0256724 | A1 * | 11/2005 | Rasin et al. | 705/1 |
| 2006/0206351 | A1 * | 9/2006 | Hodges et al. | 705/1 |
| 2006/0212931 | A1 | 9/2006 | Shull et al. | |
| 2007/0016790 | A1 | 1/2007 | Brundage et al. | |
| 2007/0083915 | A1 | 4/2007 | Janakiraman et al. | |
| 2009/0277961 | A1 * | 11/2009 | Mak | 235/384 |
| 2009/0307132 | A1 | 12/2009 | Phillips | |
| 2010/0170947 | A1 * | 7/2010 | Christofferson | 235/382 |
| 2010/0228632 | A1 | 9/2010 | Rodriguez | |
| 2011/0077983 | A1 * | 3/2011 | Hua et al. | 705/5 |
| 2011/0275360 | A1 * | 11/2011 | Sample et al. | 455/422.1 |

(Continued)

*Primary Examiner* — Curtis King
(74) *Attorney, Agent, or Firm* — Fish & Richardson P.C.

(57) ABSTRACT

A system and method of performing identity verification based on the use of mobile phones or mobile computing devices in conjunction with a secure identity authority; said method to be used as an alternative to conventional identity verification using paper-based documents such as driver's licenses and passports. The new method improves speed, accuracy, cost, and reliability of identity verification for entities that need to verify identity, as well as convenience for end-users.

24 Claims, 4 Drawing Sheets

A variation of the system shown in Figure 1

(56) References Cited

U.S. PATENT DOCUMENTS

| | | | |
|---|---|---|---|
| 2012/0198232 | A1 | 8/2012 | Hannel et al. |
| 2013/0218931 | A1 | 8/2013 | Lewis |
| 2013/0340052 | A1 | 12/2013 | Jakobsson |
| 2014/0098284 | A1 | 4/2014 | Oberpriller et al. |

* cited by examiner

Figure 1 – Conceptual Overview of the ID4Checkin System
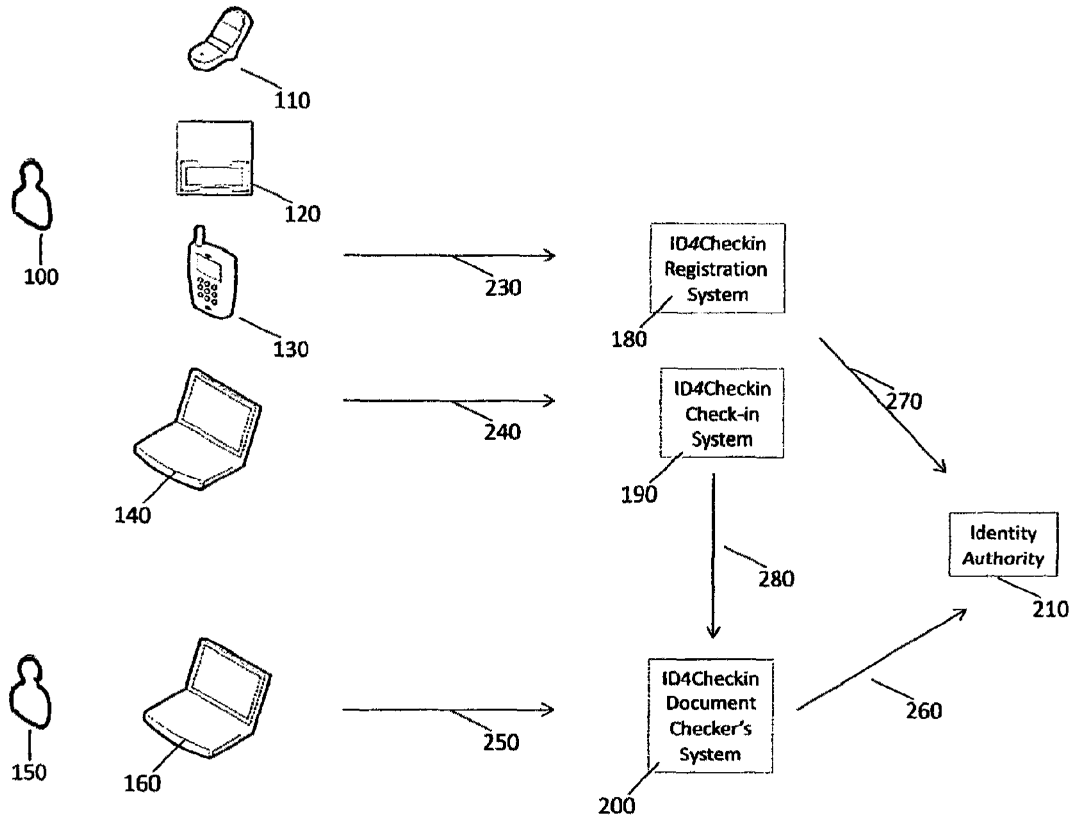

Figure 2 – A variation of the system shown in Figure 1
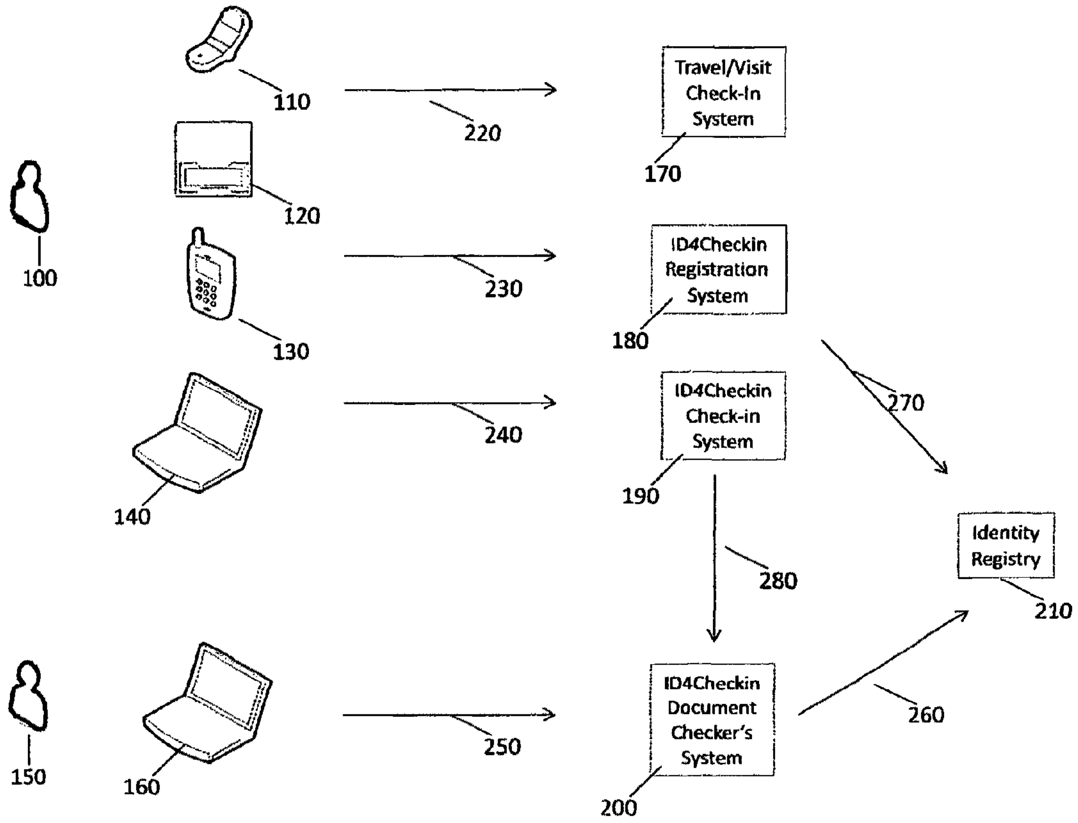

Figure 3 – Mobile Boarding Pass (300)

DELTA

Name: THIAGARAJAN SARAVANAN
PLATINUM/ELITEPLUS
BREEZEWAY
Zone: 1
Seat: 4B
Cabin: FIRST
Flight: DL1866
Time: 5:45pm
Date: Feb 11, 2010
From: Atlanta, GA, US (ATL)
To: Boston, MA, US (BOS)
Operated by: DELTA AIR LINES INC
Class: V
RecLoc: EFSTJ2
FFNum: DL2150111173
TktNum: 00677359670934
Gate: B09
Gate subject to change Figure 4 – Example Document Checker Application running on the ID4Checkin Subscriber Terminal
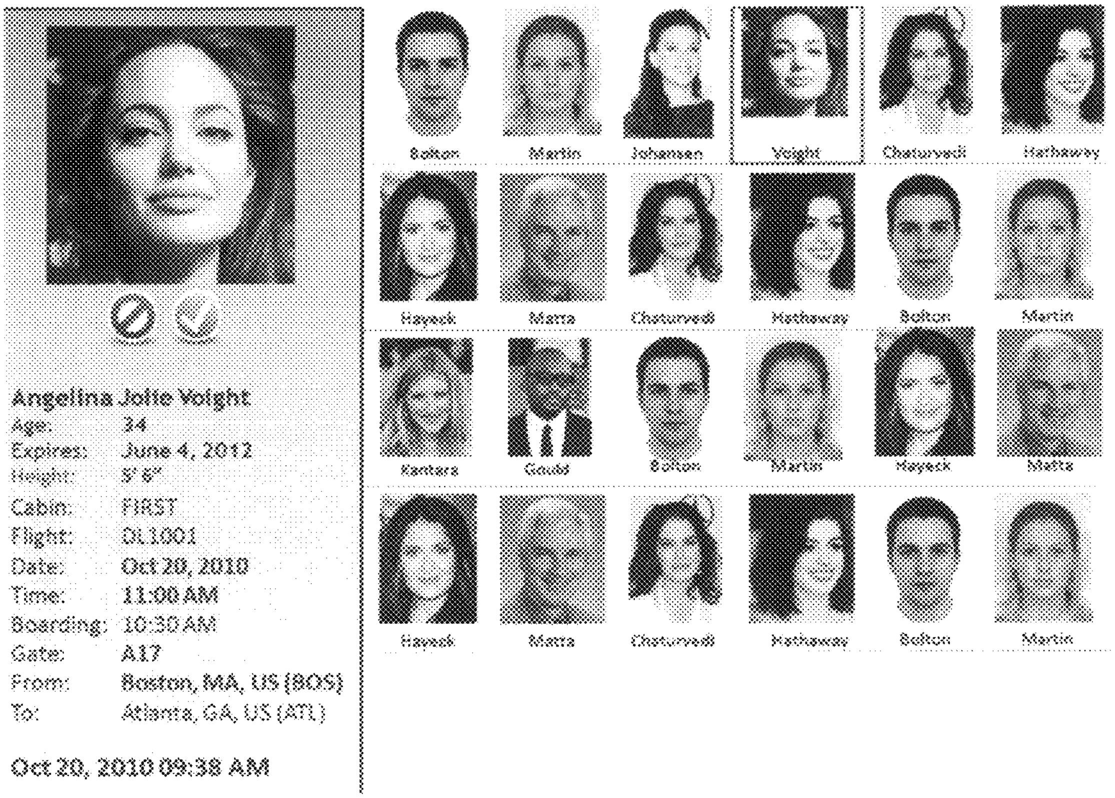

SYSTEM AND METHOD TO STREAMLINE IDENTITY VERIFICATION AT AIRPORTS AND BEYOND

REFERENCE

Provisional U.S. Patent application No. 61/458,397 filed on Nov. 23, 2010 by inventor Thiagarajan Saravanan of 4, Olde Stonebridge Path, Westborough, Mass. 01581

BACKGROUND OF THE INVENTION

The present invention is in the technical field of identity verification. More particularly, the present invention is in the technical field of using mobile phones and other computing devices for identity verification.

In the U.S., the Transportation Services Administration (TSA) employs thousands of travel document checkers at airports. Unlike Customs & Immigration officers who are trained extensively in international travel documents and possess sophisticated document checking equipment, the average TSA document checker has a simple UV or black light, loupe magnifier, and limited training on document checking. Even the TSA admits that, given the hundreds, sometimes thousands of documents and multifarious document types a checker has to scrutinize each day, the limited time the document checker has to inspect each document, and fatigue relating to processing hundreds of documents continually, a person with malicious intent could easily forge a document that would get them past a TSA document checker.

At the same time, many a business traveler is weary of having to previously print a boarding pass and pull out their driver's license card and boarding pass going through airports. Paperless boarding passes—on mobile devices—are slowly becoming more mainstream now, although their adoption has been somewhat painful for the TSA and the traveler due to the limitations of the scanning mechanisms. The logical next step is for the driver's license, passport, or other identifying document to become adopted on mobile devices as well. Then the wallet can stay in the pocket and the mobile device can be used for ID check and boarding pass check at the same time.

If a mobile device-based ID could be verified in a foolproof way by the TSA document checkers and frequent travelers could be encouraged to adopt mobile device based IDs, the job of verifying regular IDs would be made remarkably easier and more secure at the same time for the TSA document checkers. A number of additional benefits would become available to the TSA as well, because of the automation: automatic checking for or against terrorist watch lists, criminal convictions, etc.

End-users would be willing to pay a reasonable fee for the convenience of not having to pull out their wallets to get their IDs at the airports.

There are a number of challenges to get such a system put into place, though:

- How to secure the driver license on the mobile device
- How to satisfy the needs of the TSA such that they can accept the mobile device version in lieu of paper documents
- How to ensure travelers of the privacy of their information
- How to build a viable business out of it ID4Checkin™ is a novel system and service that addresses these challenges. Much of the research on identity documents, document authentication and verification in past few decades has been focused on paper- and plastic card-based identification.

There has been some recent adoption of technologies focused on electronic IDs based on smart chips such as the one embedded in the U.S. passport. E-passports typically embed some personally identifying information, such as fingerprint biometrics or portrait, in encrypted form within the smart chips. E-readers can decode the encrypted information for comparison with the passport holder's actual fingerprint or visage, for example.

The mobile revolution has simply passed the identification industry by—mainly because the revenues in the identification industry are largely focused on the production and vetting of paper- and plastic card-based identification. Mobile and computing devices now replace almost every card and implement that a person would carry in their wallet, except for the identification card.

The present invention (ID4Checkin) allows mobile and computing devices to be used for identification purposes. The focus is not on having all the identification information embedded into the device; rather, it is to provide a means for the traveler to "show" their identification to a TSA document checker or other authority using their mobile or computing device in a manner that inhibits counterfeit measures.

SUMMARY OF THE INVENTION

Each port or checkpoint that accepts ID4Checkin would have a sign with its own unique check-in code. Using the ID4Checkin system, a traveler can announce his or her self as having arrived at a checkpoint through a mobile phone or other computing device in any one of several ways as outlined below:

- By taking a photo of the ID4Checkin signpost at the checkpoint;
- By submitting the checkpoint code in a web form on a mobile browser;
- By texting the checkpoint code to ID4Checkin;
- By waving a mobile device that has near-field communications (NFC) capability at the NFC reader in the checkpoint;
- By using a touchtone or voice-recognition phone service to send in the code;
- By using an Internet browser application, logging into the ID4Checkin account, and entering the checkpoint code;
- By sending an email from a registered email account;
- Or through some other electronic means.

The TSA document checker or other authority at each checkpoint would have an ID4Checkin subscriber terminal, which is basically a tablet-, laptop-, or netbook-like computing device that has a secure communications channel to the ID4Checkin website hosting the document checker's web application.

When a traveler announces his or her self at a checkpoint through the above means, they are actually sending a request to ID4Checkin's central server, which is hooked up to a central database into which the traveler previously registered their desire to use the ID4Checkin system. ID4Checkin's central server also has the ability to correlate this information with an interstate system containing the drivers' license or passport information for travelers.

ID4Checkin's central server in turn sends the traveler's personally identifying details such as photo, name, age, height, and expiration date from the ID document (such as driver's license or passport) to the document checker's screen.

One of the unique elements of this system is that the traveler must request for his or her information to be sent to the document checker's screen. The document checker's application cannot be used to fetch the information for a traveler that has not "checked in" to the checkpoint. Also, only the information absolutely required to identify the traveler is sent to the document checker's screen. These measures provide some level of privacy to the traveler and prevent the system from being abused by document checkers.

Another aspect of this invention is the ability to correlate travel-related information with the identity-related information of the traveler. Airlines have started sending out mobile boarding passes to travelers.

For example, Delta Airlines uses mobile boarding passes from a vendor called Mobiqa. A mobile boarding pass is simply a website link that returns salient boarding pass information such as the name, flight number, flight date and time, gate number, boarding time, origin and destination of travel, plus a scan able barcode that incorporates much of this information. A system is already in place for travelers to request mobile boarding passes. Airlines typically send mobile boarding passes to travelers either directly to their phones using messaging services, or as website links to the travelers' email addresses.

ID4Checkin allows travelers to link their mobile boarding passes to their identification. One way in which a traveler could link this information, for example, would be to allow ID4Checkin to read incoming emails to the traveler's email inbox that might contain the mobile boarding pass.

When a traveler presents their ID and boarding pass, the following steps outline what a TSA document checker does for identity verification without the aid of the ID4Checkin system:

1. Verify the authenticity of the ID.
2. Compare the name on the ID to the name on the boarding pass.
3. Verify from the flight check in time on the boarding pass that this person is supposed to be at this checkpoint at this particular time.
4. Compare the photo on the ID to the person's face.
5. Make a mark on the boarding pass as having done these verifications and wave the traveler through the line; or, if there is a problem with the verification, pull the traveler aside for further processing.

With ID4Checkin, a TSA document checker would skip steps 1, 2, and 3 from the previous paragraph and do the following instead:

1. Compare the photo on the ID to the person's face.
2. Click "OK" and wave the traveler through the line; or "Not OK" to pull the traveler aside for further processing.

The ID4Checkin system would automatically perform the first three of the manual steps a TSA document checker would perform: authenticity verification, boarding pass identity comparison, and boarding pass detail verification. This would provide the following benefits to the TSA and travelers:

It's better—problems related to poor training and fatigue won't have a role in determining who flies—the system would take care of it.

It's much more reliable and secure because it eliminates the human-based verification for some of the more onerous tasks.

It's faster—only takes 2-3 seconds per passenger as opposed to tens of seconds.

It's cheaper—the TSA will need fewer agents due to faster lines.

It's more convenient—the traveler need not be standing in line with their ID and boarding pass in hand; it's one less indignity to suffer in a bothersome check-in process.

In another embodiment of the invention, the TSA could offer self-service check-in turnstiles incorporating the ID4Checkin system. The only manual part of the system described above, i.e., the comparison of the photo on the ID to the person's face, can be automated through the use of a camera in the turnstile and a one-to-one facial recognition system, which would compare the photo captured in the turnstile to the saved photo associated with the ID4Checkin ID, which would be from a driver's license or passport.

Similarly, the ID4Checkin system could be used at other locations where identity verification is required—for example, in conjunction with rental car systems, visitor management systems, and so on.

BRIEF DESCRIPTION OF THE DRAWING

FIG. 1 is a logical overview of the present invention in its broad embodiment;

FIG. 2 is a logical overview of the present invention in an expanded embodiment;

FIG. 3 is an example of a mobile boarding pass;

FIG. 4 is an example implementation of a document checker's subscriber terminal application.

DETAILED DESCRIPTION OF THE INVENTION

Referring now to the invention in more detail, in FIG. 1 there is shown the ID4Checkin User Registration System 180, the ID4Checkin Traveler Check-in System 190 and Identity Registry 210. Also shown in FIG. 1 are a mobile phone 110, an ordinary (landline) phone 120, a "smart phone" 130, and a computing device 140 which could be in the form of a hand-held, tablet, laptop, or desktop computer. Also shown are a traveler 100, a document checker 150, and a computing device 160 used by the document checker which could be in the form of a hand-held, tablet, laptop, or desktop computer. 180, 190 and 200, as well as software applications that run on 130, 140, and 160 are components of the invention where other components shown in FIG. 1 represent existing systems.

Identity Registry 210 represents a computer server and database at an institution such as a state's driver services department that is an Identity Document issuing authority, examples of which include the Massachusetts Registry of Motor Vehicles, which issues drivers licenses, the Department of State, which issues passports, and The International Justice and Public Safety Network (Nlets), which allows access to driver's license demographic and biometric information across jurisdictional boundaries.

The ID4Checkin Registration System 180 is a computer server and database that allows a traveler 100 to register his or her intention to use the ID4Checkin system. The registration system 180 would allow for computing and phone devices 110, 120, 130 and 140 to connect to it in a variety of ways, e.g., using a browser (through the HTTP or HTTPS protocols), using a computer or mobile application, through the TCP/IP protocol, using wireless access protocol (WAP), using SMS (short message system) and short message peer-to-peer protocol (SMPP), using the public service telephone network (PSTN), using cellular networks, using VoiceXML, using a near-field communications (NFC) reader, a barcode reader, a magnetic stripe reader, or any other means of connecting an end-user computing device to a computer server such that the traveler 100 can interact with the registration system 180 to provide the essential registration details needed. Such connection is represented by connection 230 in FIG. 1. Some examples of essential details are name, address, date of birth, driver's license number, passport number, green card number, phone or mobile computing device identifier, IP address of the traveler's device, location information (e.g., global positioning system—GPS—coordinates) and so on. Some or all of the essential details may be provided through connection 230.

The ID4Checkin Check-in System 190 is a computer server and database that allows a traveler 100 to announce his or her arrival at a specific location. The check-in system 190 would allow for computing and phone devices 110, 120, 130 and 140 to connect to it in a variety of ways, e.g., using a browser (through the HTTP or HTTPS protocols), using a computer or mobile application, through the TCP/IP protocol, using wireless access protocol (WAP), using the public service telephone network (PSTN), using cellular networks, using SMS (short message system) and short message peer-to-peer protocol (SMPP), using VoiceXML, using a near-field communications (NFC) reader, a barcode reader, a magnetic stripe reader, or any other means of connecting an end-user computing device to a computer server such that the traveler 100 can interact with the check-in system 190 to provide the essential check-in details needed. Such connection is represented by connection 240 in FIG. 1. Some examples of check-in details include the traveler's identity (e.g., secure login credentials), phone or mobile computing device identifier, location information (e.g., global positioning system—GPS—coordinates), arrival checkpoint identifier, and so on.

The ID4Checkin Document Checker System 200 is a computer server and database that allows a document checker 150 to use a subscriber terminal 160 to receive information regarding the identity and legitimacy of the traveler 100 through a connection 250. Subscriber terminal 160 can be any type of computing device—a hand-held, tablet, notebook, mobile, or desktop computer. Connection 280 represents information sharing between the document checker system 200 and the check-in system 190 and registration system 180. These are logical connections. All three systems, 180, 190, and 200 could exist in the same physical server and network, or they could be on different servers and physical locations.

Connection 260 allows for information exchange between the document checker system 200 and the identity registry 210. Connection 270 allows for information exchange between the registration system 180 and the identity registry 210 as well as information exchange between the check-in system 190 and the identity registry 210.

Connections 250, 260, 270, and 280 can be through any means of network connectivity, including physical Ethernet connectivity, WiFi, Internet, cellular networks, leased lines, or other conventionally used networking means.

In the simplest embodiment of the invention, the system would function as follows:

1. A traveler 100 could use any of the devices 110, 120, 130, or 140 to register with the registration system 180, which is constructed such that legitimate users will be allowed to use the system and illegitimate users will be filtered out.

One potential method through which illegitimate users will be filtered out is as follows. The registration system 180 collects a variety of information from the user, such as name, address, location, the originating phone number for a phone call, IP address of the computing device 110, 130, or 140 from which registration is being done, unique identifier of the computing device (for example, unique phone identifier or MAC address), home phone number, mobile phone number, driver's license, passport, and green card number. The information is then correlated with a variety of sources to determine the legitimacy of the user. Once the user is determined to be legitimate, a token is sent to the user's computing device 110, 120, 130, or 140 (for example, a text code or text message) which would then need to be used to make the final link between the user's computing device and the identity information which is registered in a known identity registry 210.

Other methods of correlation could also be used.

2. A traveler 100 could use any of the registered devices 110, 120, 130, or 140 to check in to the check-in system 190 as they are arriving at an identity checkpoint, which would normally correspond to a particular TSA document checker's station. For example, the Delta Airlines first class checkpoint at Boston Logan International Airport is located in the A Terminal near the entrance to gates A13-A22. Under the system described here, this checkpoint would be assigned a unique numeric code—say 123. The traveler 100 announces his or her arrival at checkpoint 123 to the check-in system 190 using one of a variety of methods:

- By clicking a button on an ID4Checkin software application ("app") on the mobile computing device 110, 130, or 140; with the app in turn sending the checkpoint numeric code to the check-in system 190
- By using the same app to take a photo of the ID4Checkin signpost at the checkpoint; the signpost having the numeric code for the checkpoint visible in text as well as some machine-readable form such as a 2D barcode or QR code; with the app in turn sending the checkpoint numeric code to the check-in system 190
- By submitting the checkpoint code in a website form offered by the check-in system 190
- By texting the checkpoint code to the check-in system 190 from a registered computing device 110, 130, or 140
- By using a touchtone or voice-recognition phone service from a registered computing or phone device 110, 120, 130, or 140 to send the checkpoint code to check-in system 190
- By using an Internet browser application, logging into the ID4Checkin account, and entering the checkpoint code.
- By sending an email from a registered email account.
- By waving his or her NFC-enabled phone at an NFC reader that is set up to send the information to the check-in system 190
- Other methods could also be used, as long as the check-in system 190 gets the checkpoint code and a reasonable amount of certainty as to the identity of the person who originated the request 3. Document checker 150 uses a subscriber terminal 160 to login to the document checker system 200 at the beginning of his or her work day. As travelers arrive at the checkpoint and announce their arrivals, subscriber terminal 160 starts receiving photos and identities of those travelers. Document checker 150 then simply-needs to compare the photo of the traveler to the traveler's visage to confirm his or her identity. This basic ability makes the whole system more secure because, in the current system where the TSA document checker first inspects the ID to ensure that it is legitimate, and then compares the photo on the document to the person's visage, the inspection is a weakness to the system due to the reasons mentioned in the Summary section.

An enhancement to the basic invention is the ability to automatically compare the identity information to the information in an airline boarding pass, and automatically verify the legitimacy of the traveler to be at the checkpoint. The enhanced system would work as follows:

4. A traveler 100 could use any of the devices 110, 120, 130, or 140 to register with the registration system 180, which is constructed such that legitimate users will be allowed to use the system and illegitimate users will be filtered out.

One potential method through which illegitimate users will be filtered out is as follows. The registration system 180 collects a variety of information from the user, such as name, address, location, the originating phone number for a phone call, IP address of the computing device 110, 130, or 140 from which registration is being done, unique identifier of the computing device (for example, unique phone identifier or MAC address), home phone number, mobile phone number, driver's license, passport, and green card number. The information is then correlated with a variety of sources to determine the legitimacy of the user. Once the user is determined to be legitimate, a token is sent to the user's computing device 110, 120, 130, or 140 (for example, a text code or text message) which would then need to be used to make the final link between the user's computing device and the identity information which is registered in a known identity registry 210.

Other methods of correlation could also be used.

5. A traveler 100 could use the online check-in system 170 offered by most airlines today to check into his or her upcoming flight, typically up to 24 hours prior to the flight takeoff time. The traveler would have the ability to receive a so-called "mobile boarding pass" 300, which is typically sent to the user in the form of an email. The email contains the uniform resource locator (URL) for a web page that contains the mobile boarding pass, an example of which is shown in FIG. 3. The mobile boarding pass contains information such as the traveler's name, flight number, departure time, departure gate, and so on. The traveler 100 would provide access to the ID4Checkin check-in system 190 to emails containing boarding passes such that when a traveler 100 receives an email containing a mobile boarding pass, the check-in system 190 is automatically updated with this information.

Other methods could also be used to update the check-in system 190 with the mobile boarding pass information, such as a direct link with the airlines, the TSA, or a third-party travel services provider such as TripIt.com.

6. A traveler 100 could use any of the registered devices 110, 120, 130, or 140 to check in to the check-in system 190 as they are arriving at an identity checkpoint, which would normally correspond to a particular TSA document checker's station. For example, the Delta Airlines first class checkpoint at Boston Logan International Airport is located in the A Terminal near the entrance to gates A13-A22. Under the system described here, this checkpoint would be assigned a unique numeric code—say 123. The traveler 100 announces his or her arrival at checkpoint 123 to the check-in system 190 using one of a variety of methods:

- By clicking a button on an ID4Checkin software application ("app") on the mobile computing device 110, 130, or 140; with the app in turn sending the checkpoint numeric code to the check-in system 190
- By using the same app to take a photo of the ID4Checkin signpost at the checkpoint; the signpost having the numeric code for the checkpoint visible in text as well as some machine-readable form such as a 2D barcode or QR code; with the app in turn sending the checkpoint numeric code to the check-in system 190
- By submitting the checkpoint code in a website form offered by the check-in system 190
- By texting the checkpoint code to the check-in system 190 from a registered computing device 110, 130, or 140
- By using a touchtone or voice-recognition phone service from a registered computing or phone device 110, 120, 130, or 140 to send the checkpoint code to check-in system 190
- By using an Internet browser application, logging into the ID4Checkin account, and entering the checkpoint code.
- By sending an email from a registered email account.
- By waving his or her NFC-enabled phone at an NFC reader that is set up to send the information to the check-in system 190
- Other methods could also be used, as long as the check-in system 190 gets the checkpoint code and a reasonable amount of certainty as to the identity of the person who originated the request 7. Document checker 150 uses a subscriber terminal 160 to login to the document checker system 200 at the beginning of his or her work day. As travelers arrive at the checkpoint and announce their arrivals, subscriber terminal 160 starts receiving photos and identities of those travelers. Document checker 150 then simply needs to compare the photo of the traveler to the traveler's visage to confirm his or her identity.

8. Document checker 150 can also verify the legitimacy of the traveler to be at the checkpoint at that particular date and time. Without this invention, such verification is done manually by the document checker. With this invention, the subscriber terminal would automatically use the details from the boarding pass, such as the traveler's flight time, departure gate, and departure time, to determine the legitimacy of the traveler to be at the checkpoint. FIG. 4 shows an example implementation of the document checker application, which would run on the subscriber terminal 160 in conjunction with the document checker's system 200.

A variation of this invention could be created by changing the circumstances. For example, the travel/visit check-in system 170 could be the rental reservation system for a car or equipment rental company or the visitor management system of a building or secure facility, for example.

The document checker subscriber terminal 160 may or may not be a computing device dedicated to performing the identity verification. By providing a system development kit, the document checking function could be integrated with another application like a rental car reservation system, visitor management system, and so on.

The advantages of the present invention include, without limitation, that it is a more secure, reliable, quick, and automated method of performing identity verification at checkpoints.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A system for performing identity verification of a user in conjunction with a secure identity authority; the system comprising:

a registration subsystem configured to (i) receive a variety of information of the user who signs up to use the system for identity verification at a public facility admitting legitimate users with verified identities; and (ii) in response to determining that the user is legitimate after the variety of information of the user has been positively correlated with sources that include the secure identity authority that is backed by a government-sponsored vetting process, register the user in a storage device of the system; and (iii) solely based on the registration of the user, when the registered user's arrival at the public facility is detected through a mobile device of the registered user, automatically retrieving from the security identity authority information encoding an identity of the registered user as originally captured by the secure identity authority via the government-sponsored vetting process such that the information encoding the identity of the registered user that otherwise would not be present at the public facility becomes instantly available at the public facility for verifying the registered user's identity before the registered user is admitted, wherein the information encoding the identity of the registered user includes a facial portrait of the registered user; and wherein the secure identity authority is remote from but in communication with the system; and a document checker subscriber terminal in communication with the registration subsystem; the document checker subscriber terminal includes at least one display device and is configured to:

(i) retrieve, from the registration subsystem, at least portions of the information encoding the identity of the registered user that includes the facial portrait of the registered user;

(ii) display, at one of the at least one display device of the document checker subscriber terminal, the at least portions of the identity information of the registered user that includes the facial portrait of the registered user; and (iii) receive, from a trusted third party, a notice that the registered user will be at an identity checkpoint.

2. The system of claim 1, further comprising:

a check-in subsystem in communication with the registration subsystem and configured to receive, from the mobile device of the registered user, information locating the identity checkpoint where the registered user is about to check in.

3. The system of claim 2, wherein the check-in subsystem is further configured to retrieve a checkpoint code from the information locating the identity checkpoint.

4. The system of claim 3, wherein the check-in subsystem is further configured to confirm, based in part on the checkpoint code, that the registered user is indeed at the identity checkpoint.

5. The system of claim 1, further comprising:

a check-in subsystem in communication with the registration subsystem and configured to scan a mobile pass issued to the registered user to identify (i) travel-related information including information locating the identity checkpoint for the registered user to check in, and (ii) personally identifiable information of the registered user.

6. The system of claim 1, wherein the document checker subscriber terminal is further configured to automatically determine that the registered user is at the identification checkpoint by automatically comparing the personally identifiable information of the registered user to the retrieved portion of the information encoding the identity of the registered user.

7. The system of claim 1, wherein the registration subsystem is further configured to correlate retrieved identification information of the registered user with information included in the notice received from the trusted third party.

8. The system of claim 1, wherein the registration subsystem is further configured to:

register the user by registering the mobile device of the user to establish a link between the mobile device of the registered user and the identity information of the registered user.

9. The system of claim 1, wherein the registration subsystem is further configured to:

receive the variety of the information of the user from the mobile device of the user.

10. The system of claim 9, wherein the registration subsystem is further configured to:

receive the variety of information that includes personally identifiable information of the user as well as information identifying the mobile device of the user.

11. The system of claim 1, wherein the registration subsystem is further configured to:

solely based on the registration of the user, when the registered user's arrival at the public facility is announced by the mobile device of the registered user, automatically retrieving from the security identity authority the information encoding the identity information of the registered user.

12. A method for performing identity verification of a user in conjunction with a secure identity authority; the method comprising:

receiving a variety of information of the user who signs up to use an identity verification system to check in at a public facility admitting legitimate users with verified identities;

in response to determining that the user is legitimate after the variety of information of the user has been positively correlated with sources that include the secure identity authority that is backed by a government-sponsored vetting process, registering the user in a storage device of the identity verification system; and solely based on the registration of the user, when the registered user's arrival at the public facility is detected through a mobile device of the registered user, automatically retrieving from the security identity authority information encoding an identity of the registered user as originally captured by the secure identity authority via the government-sponsored vetting process such that the information encoding the identity of the registered user that otherwise would not be present at the public facility becomes instantly available at the public facility for verifying the registered user's identity before the registered user is admitted, wherein the information encoding the identity of the registered user includes a facial portrait of the registered user; and wherein the secure identity authority is remote from but in communication with the identity verification system;

retrieving at least portions of the identity information of the registered user that includes the facial portrait of the registered user;

displaying the at least portions of the identity information of the registered user that includes the facial portrait of the registered user; and receiving, from a trusted third party, a notice that the registered user will be at an identity checkpoint.

13. The method of claim 12, further comprising:

receiving, from the mobile device of the registered user, information locating the identity checkpoint where the registered user is about to check in.

14. The method of claim 13, further comprising:

retrieving a checkpoint code from the information locating the identity checkpoint.

15. The method of claim 14, further comprising:

confirming, based in part on the checkpoint code, that the registered user is indeed at the identity checkpoint.

16. The method of claim 12, further comprising:

scanning a mobile pass issued to the registered user to identify (i) travel-related information including information locating the identity checkpoint for the registered user to check in, and (ii) personally identifiable information of the registered user.

17. The method of claim 16, further comprising:

automatically determining that the registered user is at the identity checkpoint.

18. The method of claim 17, wherein automatically determining includes automatically comparing the personally identifiable information of the registered user to the retrieved information encoding the identity of the registered user.

19. The method of claim 12, further comprising:

correlating retrieved identification information of the mobile device of the registered user with information included in the notice received from the trusted third party.

20. The method of claim 12, further comprising:

registering the user by registering the mobile device of the user to establish a link between the mobile device of the registered user and the identity information of the registered user.

21. The method of claim 20, further comprising: based on the established link between the mobile device of the user and the identity information of the user, retrieving the at least portions of the identity information.

22. The method of claim 12, wherein receiving the variety of the information of the user includes: receiving the variety of the information of the user from the mobile device of the user.

23. The method of claim 22, wherein receiving the variety of the information of the user further includes: receiving the variety of information that includes personally identifiable information of the user as well as information identifying the mobile device of the user.

24. The method of claim 12, further comprising:

solely based on the registration of the user, when the registered user's arrival at the public facility is announced by the mobile device of the registered user, automatically retrieving from the security identity authority the information encoding the identity information of the registered user.

* * * * *